Nov. 4, 1958  R. E. BUCK ET AL  2,859,044
COMPENSATING CHUCK

Filed May 7, 1956  2 Sheets-Sheet 1

INVENTOR.
RUSSELL E. BUCK
BY  TED D. KINNEY
Woodhams, Blanchard & Flynn
ATTORNEYS

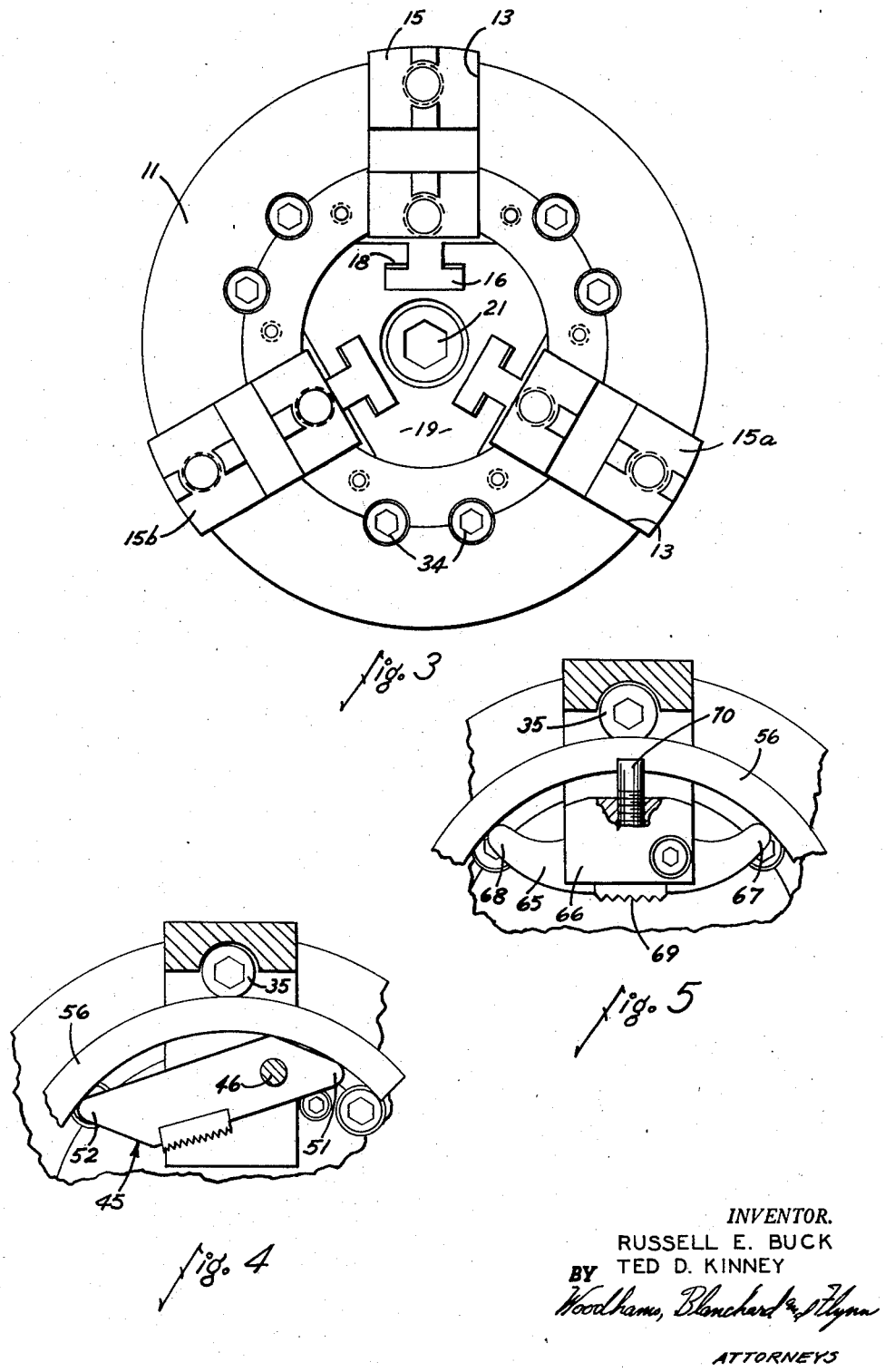

United States Patent Office 2,859,044
Patented Nov. 4, 1958

2,859,044

COMPENSATING CHUCK

Russell E. Buck, Scotts, and Ted D. Kinney, Kalamazoo Township, Kalamazoo County, Mich., assignors to Buck Tool Company, Kalamazoo, Mich., a corporation of Michigan Application May 7, 1956, Serial No. 583,056

13 Claims. (Cl. 279—123)

This invention relates to chuck construction and it relates particularly to a type automatically accommodating its gripping jaws to an eccentric peripheral surface.

A number of different kinds of chucks have been developed to meet this problem and they are frequently referred to in the industry as "compensating chucks" to indicate that their jaws automatically compensate for irregularities in the surface of the work to be engaged. However, all of said chucks, insofar as we are aware, require some type of mechanical linkage extending more or less directly between said chuck jaws. One type of such linkage involves mechanical elements extending from each of the jaws to respectively spaced points within the chuck body and then extending from said points to a common centering device, whereby movement of one of said jaws will act through said linkage and said centering device to cause a complementary movement of either or both of the others of said jaws. Another known type of device involves mechanism lying outside the face of the chuck body and includes a ring and actuating levers lying radially between the engaging surfaces of the jaws but axially off-set therefrom.

The first mentioned of such mechanisms is undesirable because of the frictional losses occurring within the mechanism connecting the jaws which often means that the work is held at one side with a greater pressure than on the opposite side. This may result in the work being actually held off-center, or, if a centering device is used, it may result in an excessive pressure being applied to one side of the centering device which often ultimately results in its breaking. The second mentioned type of mechanism is less objectionable from a frictional standpoint but it has an excessive and highly undesirable overhang, that is, the actual distance from the gripping surfaces of the jaws to the face of the chuck body is too great to be fully acceptable.

Accordingly, it has long been desirable to provide a chuck of the compensating type which is characterized by low frictional losses in the mechanisms connecting the respective jaws with each other and yet which does not require an excessive overhang from the face of the chuck body to the work engaging surfaces of the jaws. Further, it is desirable to provide such mechanism which is readily interchangeable with the regular jaws of a standard chuck in order that a given chuck body may be adapted for either type of use by the simple application thereto of jaws appropriate to the type of work desired.

Accordingly, a major object of the invention has been to provide a compensating chuck having low frictional losses in the mechanism connecting the respective jaws.

A further object of the invention has been to provide a compensating chuck having little, if any, greater distance from the face of the chuck body to the work engaging surfaces of the jaws than is required for a standard chuck.

A further object of the invention has been to provide a compensating chuck whose jaws are readily interchangeable with the standard jaws on a standard chuck body.

A further object of the invention has been to provide a compensating chuck wherein the compensating features are wholly external of the chuck body and of the jaw driving mechanism in order that a standard chuck body may be utilized with either standard jaws or with jaws converting it into a compensating chuck.

A further object of the invention has been to provide a compensating chuck whose jaws will quickly and easily equalize and will thereby bear upon the work with substantially equal pressure with respect to each other.

A further object of the invention has been to provide a compensating chuck of sufficiently simple characteristics that it can be manufactured with a high degree of economy and can be used with relatively low maintenance requirements.

A further object of the invention has been to provide a compensating chuck which is rugged and durable.

A further object of the invention has been to provide a compensating chuck which has sufficient adjustability that it can be used on work of different sizes within reasonable limits.

A further object of the invention has been to provide a compensating chuck which can be mounted directly on, and be operated by, the jaw moving elements of any standard automatic chuck whether manually or power operated and from which, if power operated, work can be removed and new work inserted without the necessity of stopping the chuck.

A further object of the invention has been to provide a chuck, as aforesaid, to which a safety guard can be readily applied which will enable a workman to work fairly close to the surface of said chuck without danger to his hands.

Other objects and purposes of the invention will be apparent to persons acquainted with apparatus of this general type upon a reading of the following disclosure and inspection of the accompanying drawings.

In the drawings:

Figure 3 is a sectional view taken along the line III—III of Figure 2.

Figure 4 is a sectional view taken along the line IV—IV of Figure 2.

Figure 5 is a view, similar to Figure 4, of a modified structure.

General description

Figures 1, 2:
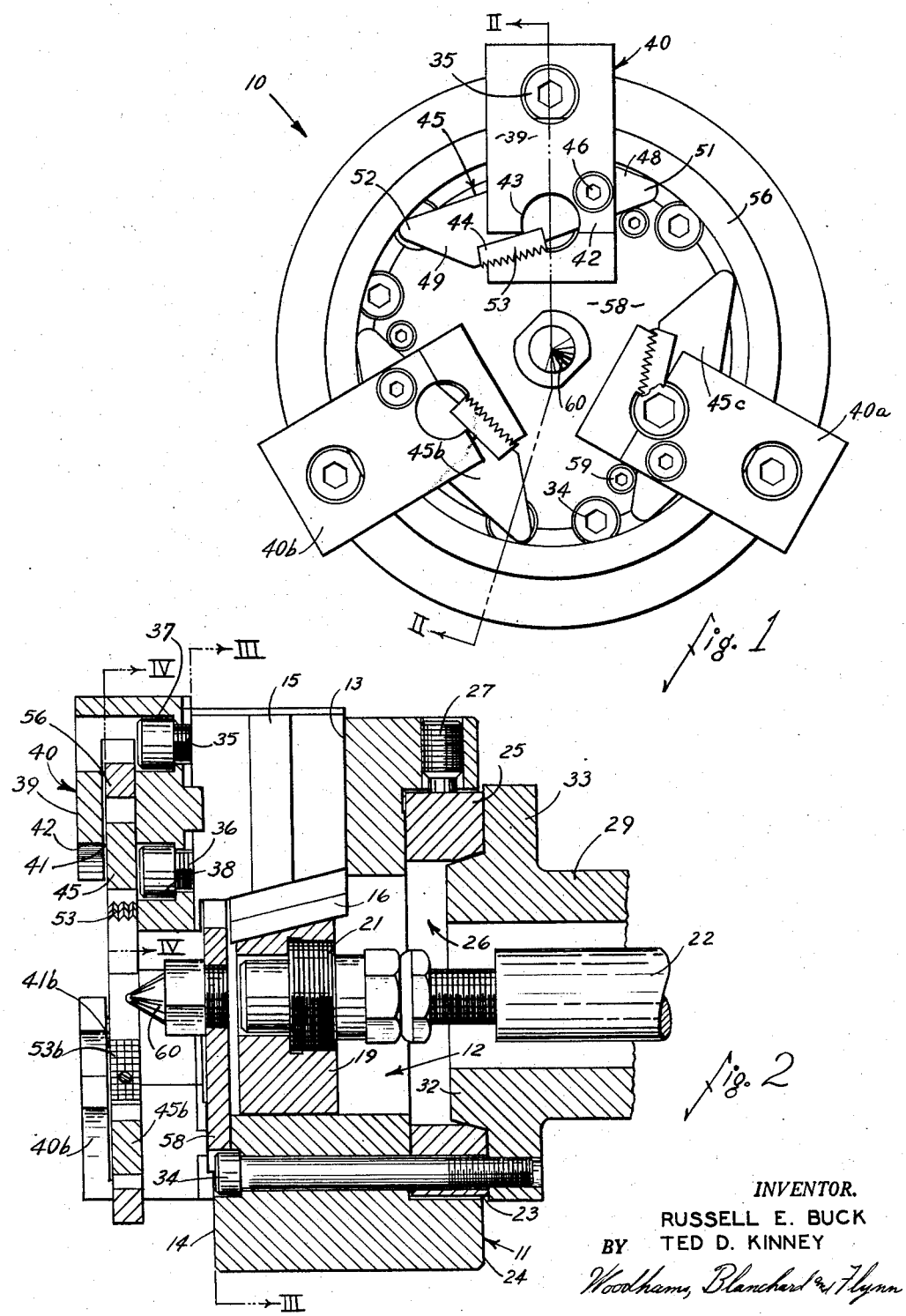
Figure 1 is a front elevation view of the improved chuck.
Figure 2 is a sectional view taken along the line II—II of Figure 1.

The invention relates to a power chuck 10 employing a plurality of radially movable carrier members 15, 15a and 15b. The work contacting members are mounted for pivotal movement on support structure which is secured to the carrier members. An annular ring encircles the work contacting members and is adapted to engage the end portions thereof to cause simultaneous pivotal movement of all of the work contacting members when one of the work contacting members is pivotally moved a predetermined distance.

Detailed description

The power chuck 10 includes a chuck body 11 which is provided with a plurality, here three, of radially disposed guideways 13 in its axial face 14, said face being leftwardly as appearing in Figure 2 and which may for reference be hereinafter sometimes termed a forward face. Carrier members 15, 15a and 15b are radially slidably disposed within the guideways 13.

The radially inner end of each of the carrier members 15, 15a and 15b is provided with a T-shaped tongue 16 having flanges converging axially of the chuck body toward the axis of chuck 10 on the forward face side thereof. Each T-shaped tongue 16 is slidably disposed within a corresponding T-shaped slot 18 in a substantially cylindrical wedge member 19 which is axially slidably disposed in a bore 12 in the chuck body 11. The slots 18 taper leftwardly as appearing in Figure 2, that is, toward the forward face of the chuck body. The T-shaped slots 18 cooperate with the T-shaped tongue 16 on each of the carrier members 15, 15a and 15b to effect radial movement of said carrier members with respect to the chuck body 11 in response to axial movement of the wedge member 19 in known manner. The wedge member is secured, as by a stud 21, to a co-axial draw bar 22. The draw bar 22 is axially reciprocable by conventional means, such as a fluid actuated pressure cylinder, not shown.

A cylindrical, co-axial adapter recess 23 which is a counterbore to the bore 12 is provided in the rear or rightward axial face 24 of the chuck body 11 for loose reception of an adapter ring 25 having a co-axial opening 26 therethrough. The ring 25 is held within the recess 23 for radial adjustment with respect to the radial wall of said recess by means of a plurality of adjustment screws, of which one is shown at 27, radially disposed within the chuck body 11 and extendable into the recess 23 through the radial wall thereof.

The chuck 10 may be mounted and rotated by a hollow spindle 29 which encircles draw bar 22. The spindle 29 has a cylindrical, or conical, end portion 32 snugly receivable into the adapter ring opening 26, and an annular flange 33 adjacent to said end portion and abutting against ring 25. The chuck body 11 and ring 25 are secured to flange 33 of spindle 29 by a plurality of bolts 34.

The description given thus far is of the power chuck disclosed in co-pending application Serial No. 461,203 now Patent No. 2,763,488 owned by the assignee of the present invention. It is to be understood that the foregoing description is given for illustrative purposes only and that the invention about to be described can be used on chucks, either air or manually operated, which differ in many details from the foregoing structure. It is pointed out that the work contacting jaws of the chuck may be secured to, or be integral with, the carrier members 15, 15a and 15b. The invention about to be described may be an attachment for such conventional chucks, in which case the mounting structure will be detachably securable to the carrier members or to the chuck jaws. Alternatively, the mounting structure may be integral with the carrier members, in which case the chuck will not be capable of use as a standard chuck but will be usable only as a compensating chuck.

Since the mounting structure and the lever construction of each of the work contacting members are identical, only one of these will be described in detail herein. Corresponding parts in the other mounting structures and lever constructions will be identified by the same reference characters with the suffix "a" or "b" added thereto.

A mounting block 40, which is generally rectangular in shape, is secured to the carrier member 15 by a pair of tap bolts 35 and 36. The bolts 35 and 36 pass through openings 37 and 38 in the block 40. A radially extending slot 41 is provided in the block and extends from the radially inward edge toward the periphery thereof. The slot 41 is parallel with and spaced forwardly of the face 14 of chuck body 11. The radially inward portion of forward wall 39 of the block 40 forwardly of slot 41 is cut away to form a shoulder 42. The shoulder has an arcuate recess 43 therein providing for convenient securing of bolt 36 to carrier member 15.

The work contacting member is a lever 45 which is mounted in slot 41 and connected to block 40 for pivotal movement in a plane parallel with the forward face 14 of the chuck. A pivot pin 46 passes through lever 45 and is tapped into mounting block 40, said pivot pin being located eccentrically in said lever. The lever 45 is shaped, in general, like a parallelepipedon and has end or contact portions 48 and 49 which extend outwardly with respect to the axis of the chuck. The ends of the lever are rounded as at 51 and 52. A block 44 having a work engaging surface 53 is secured to the lever 45. The block is positioned eccentrically on the lever on the opposite side of the center thereof from pivot pin 46.

An annular ring 56 is positioned in the slot 41 radially outwardly of lever 45 and is movable radially thereof. The ring 56 is located in radial alignment with the lever 45 and is adapted to contact the ends 51 and 52 thereof. The ring 56 is retained in position by forward wall 39. Since the ring 56 is not connected to the chuck, it may be considered to be free-floating with respect thereto. The chuck 10 has a center plate 58 located forwardly of wedge ring 19 which is secured to the chuck body 11 by screws 59. A center 60 is secured to center plate 58 and extends forwardly of the face 14, co-axial with the axis of the chuck, to a position aligned with the work engaging surfaces 53, 53a and 53b.

Operation

The carrier members 15, 15a and 15b are movable a limited distance in response to movement of wedge ring 19, said distance in one preferred embodiment of the invention being ⅜ inch. In the position shown in Figure 2, the jaw carriers are at their radially outward position and the end 52 of lever 45 is contacting the ring 56, and the other end 51 is also preferably contacting said ring. This is the non-work engaging position of the work contacting surfaces 53, 53a and 53b.

When the wedge ring 19 is moved rearwardly as appearing in Figure 2, the jaw carriers 15, 15a and 15b, the blocks 40, 40a and 40b and work engaging surfaces 53, 53a and 53b will be moved radially inwardly. Assuming that a work piece having an eccentric peripheral surface is mounted on the center 60, one of the work engaging surfaces, herein assumed to be surface 53, will contact the peripheral surface of the work piece before the others. Because of the eccentric mounting of the work engaging surface 53, the lever 45 will pivot clockwise as appearing in Figure 1 and urge end portion 49 outwardly. The urging of the end portion will shift the ring 56 out of co-axial alignment with center 60. Shifting of the ring 56 will effect pivotal movement of the other levers counterclockwise as appearing in Figure 1, thereby causing the work engaging surfaces thereof to move closer to the center 60. Thus, the ring 56 will shift off-center to compensate for the work piece being off-center and the work contacting surfaces will grip the work with equal pressure.

When it is desired to change the work piece, the wedge ring is moved forwardly which causes the carriers 15, 15a and 15b and structure secured thereto to move radially outwardly. As the levers move outwardly, they will be pivoted counterclockwise until they assume the position shown in Figure 1. This will cause automatic centering of ring 56. Obviously the work piece may be changed when the lathe or other machine with which the chuck is associated is running or stopped.

The eccentric mounting of the levers 45, 45a and 45b not only permits the use of the levers for compensating purposes but also gives a mechanical advantage thereby increasing the gripping power imparted to the work contacting surface.

The shape and size of the levers 45 and block 44, the size of ring 56 and the amount of movement of carrier member 15 are chosen with due regard for the general type of work piece with which the chuck is designed to be used so that the work piece will effectively grip the work piece when the ends 52 of the lever engage the ring. Blocks similar to, but having a work engaging surface of different shape, may be substituted for blocks 44 if desired or required.

Modification

The lever may take various forms and the position of its work contacting surface may be varied. Referring to Figure 5, a crescent-shaped lever 65 may be eccentrically pivotally mounted upon a block 66. The ends 67 and 68 of the lever are rounded and are adapted to contact the ring 56 as in the previously described embodiment. The work engaging surface 69 is centrally located on the lever 65. A stud 70 is threaded in carrier member 66 and extends radially outwardly therefrom and overlaps the ring 56 to hold same in position. The block 66 is secured to the carrier member in any conventional fashion. The operation of this embodiment of the invention is identical with the operation of the embodiment of Figures 1 to 4 previously described.

Although the above mentioned drawings and description refer to particular, preferred embodiments of the invention, it is not our intention, implied or otherwise, to eliminate other variations or modifications thereof unless specfically stated to the contrary in the hereinafter appended claims.

We claim:

1. A chuck construction, comprising in combination: a chuck body, said chuck body having a plurality of radially directed guideways therein; a carrier member movably mounted in each of said guideways; a mounting block secured to each of said carrier members; a work contacting member pivotally mounted on each of said mounting blocks, each of said work contacting members having end portions extending outwardly; a radially movable annular ring encircling said work contacting members and adapted to contact the end portions thereof.

2. A chuck construction, comprising in combination: a chuck body, said chuck body having a plurality of radially directed guideways therein; a carrier member movably mounted in each of said guideways; a mounting block secured to each of said carrier members, said mounting block having a generally radially extending slot extending from the radially inward face thereof; a work contacting member eccentrically pivotally mounted on each of said mounting blocks within the slot thereof, each of said work contacting members having end portions extending outwardly; a free-floating, radially movable, annular ring encircling said work contacting members and adapted to contact the end portions thereof, said annular ring lying within the slot in each of said mounting blocks radially outwardly of said work contacting member.

3. The combination of claim 2 including means fixed to said mounting block for retaining said annular ring in said slots.

4. An attachment for converting a power chuck to a compensating chuck, comprising in combination: a plurality of mounting of mounting blocks securable to the jaws of said power chuck; a lever eccentrically mounted for pivotal movement on each of said mounting blocks, each of said levers having a work contacting member thereon, each of said levers having end portions extending outwardly; radially movable means engageable with the end portions of each of said levers for causing simultaneous pivotal movement of each of said levers in response to movement of one lever.

5. A chuck construction, comprising in combination: a chuck body, said chuck body having a plurality of radially directed guideways therein; a carrier member movably mounted in each of said guideways; a work-contacting member on each of said carrier members and movable therewith, each of said work-contacting members being pivotal with respect to its associated carrier member, and each of said work-contacting members having contact means thereon spaced from the pivot axis of said work-contacting member; radially movable means engageable with said contact means of said work-contacting members for causing simultaneous pivotal movement of each of said work-contacting members in response to movement of one work-contacting member.

6. The chuck construction of claim 5, wherein said radially movable means includes a free-floating, annular ring encircling said work-contacting members.

7. A chuck construction, comprising in combination: a chuck body, said chuck body having a plurality of radially directed guideways therein; a carrier member mounted in each of said guideways for radial movement; a work-contacting member on each of said carrier members and movable therewith, each of said work-contacting members being eccentrically pivotally connected to its associated carrier member, and each of said work-contacting members having contact means thereon on the radially outer portion thereof spaced from the pivot axis of said work-contacting member; a radially movable, annular ring encircling said work-contacting members and engageable with the contact means thereon.

8. A chuck construction, comprising in combination: a chuck body, said chuck body having a plurality of radially directed guideways therein; a carrier member movably mounted in each of said guideways; a work-contacting member on each of said carrier members and movable therewith, each of said work-contacting members being pivotal with respect to its associated carrier member, and each of said work-contacting members having end portions extending outwardly; a radially movable member encircling said work-contacting members and engageable with the end portions thereof.

9. A chuck construction, comprising in combination: a chuck body, said chuck body having a plurality of radially directed guideways therein; a carrier member movably mounted in each of said guideways; a mounting block secured to each of said carrier members; a work-contacting member mounted on each of said mounting blocks, each of said work-contacting members being pivotal with respect to its associated carrier member and having end portions extending outwardly; a free-floating, radially movable, annular ring encircling said work-contacting members and adapted to contact the end portions thereof.

10. A chuck construction, comprising in combination: a chuck body, said chuck body having a plurality of radially directed guideways therein; a carrier member mounted for radial movement in each of said guideways; means, including a member having a work-contacting surface, eccentrically pivotally mounted on each of said carrier members, said last mentioned means being radially movable with its associated carrier member and having end portions extending outwardly; a radially movable, annular ring encircling said work-contacting members and adapted to contact the end portions thereof; and means for preventing substantial movement of said ring axially of said chuck body and for retaining said ring in position for contact with said end portions.

11. A chuck construction, comprising in combination: a chuck body having a plurality of work contacting members mounted thereon for pivotal movement with respect thereto, the pivot axis of each work contacting member extending longitudinally of said chuck body, each said work contacting member having contact means thereon on either side of the pivot axis of said work contacting member; a free-floating ring mounted independently of said chuck body and of said work contacting members, said ring being engageable with said contact means for causing pivotal movement of said work contacting members.

12. A chuck construction, comprising in combination: a chuck body having a plurality of work contacting members mounted thereon and movable with respect thereto; a free-floating inextensible ring encircling said work contacting members and mounted independently of said chuck body and of said work contacting members, said ring being engageable with said work contacting members to cause movement thereof with respect to said chuck body.

13. A chuck construction, comprising in combination: a chuck body having a plurality of work contacting members mounted thereon and movable with respect thereto; a free-floating ring encircling said work contacting members and mounted independently of said chuck body and said work contacting members; means independent of the ring for moving said work contacting members radially of said chuck body, said ring being directly engageable with said work contacting members to cause movement thereof with respect to said chuck body.

References Cited in the file of this patent

UNITED STATES PATENTS

| | | |
|---|---|---|
| 1,446,060 | Pratt | Feb. 20, 1923 |
| 2,524,485 | Sloan | Oct. 3, 1950 |
| 2,794,648 | Sampson | June 4, 1957 |